US012140908B2

(12) United States Patent
Satoh et al.

(10) Patent No.: US 12,140,908 B2
(45) Date of Patent: Nov. 12, 2024

(54) TIMEPIECE DISPLAY PLATE, TIMEPIECE, AND METHOD OF MANUFACTURING TIMEPIECE DISPLAY PLATE

(71) Applicant: CITIZEN WATCH CO., LTD., Tokyo (JP)

(72) Inventors: Shinji Satoh, Yamanashi (JP); Naoto Takashima, Yamanashi (JP)

(73) Assignee: Citizen Watch Co., Ltd., Tokyo (JP)

( * ) Notice: Subject to any disclaimer, the term of this patent is extended or adjusted under 35 U.S.C. 154(b) by 616 days.

(21) Appl. No.: 17/131,576

(22) Filed: Dec. 22, 2020

(65) Prior Publication Data

US 2021/0191329 A1 Jun. 24, 2021

(30) Foreign Application Priority Data

Dec. 23, 2019 (JP) ................................ 2019-231322
Jan. 15, 2020 (JP) ................................ 2020-004295

(51) Int. Cl.
*G04B 19/12* (2006.01)

(52) U.S. Cl.
CPC .................................... *G04B 19/12* (2013.01)

(58) Field of Classification Search
CPC ................................ G04B 19/12; G04B 19/06
See application file for complete search history.

(56) References Cited

U.S. PATENT DOCUMENTS

2003/0224201 A1* 12/2003 Kawakami .............. C23C 14/16 420/512
2008/0159083 A1* 7/2008 Kawakami ............. G04B 19/12 368/232
2012/0044788 A1 2/2012 Takasawa
2012/0155225 A1* 6/2012 Takasawa .......... G04B 45/0076 368/223
2012/0155228 A1* 6/2012 Murazumi ........... G04B 19/042 205/159
2019/0047190 A1* 2/2019 Shin ........................ B32B 27/18
2020/0201261 A1* 6/2020 Marlot Doerr ........ G04B 19/10
2021/0088973 A1* 3/2021 Francois ............ G04B 45/0007

FOREIGN PATENT DOCUMENTS

JP S60-029486 A 2/1985
JP H10301497 A 11/1998
JP 2006214733 A 8/2006
JP 2010054304 A 3/2010
JP 2020-107322 A 5/2010
JP 2010101712 A * 5/2010
(Continued)

OTHER PUBLICATIONS

Machine Translation of JP2010101712 (Year: 2010).*
(Continued)

*Primary Examiner* — Edwin A. Leon
*Assistant Examiner* — Jason M Collins
(74) *Attorney, Agent, or Firm* — Knobbe, Martens, Olson & Bear, LLP

(57) ABSTRACT

A timepiece display plate includes a flat plate base that transmits light, a plurality of metallic foil pieces that are disposed on one face of the base, each of the plurality of metallic foil pieces having a thickness that transmits the light, and a protection layer that is laminated on the one face to cover the metallic foil pieces and transmit the light.

19 Claims, 12 Drawing Sheets

(56) References Cited

FOREIGN PATENT DOCUMENTS

| | | | |
|---|---|---|---|
| JP | 2012-063342 | A | 3/2012 |
| JP | 2015161621 | A | 9/2015 |

OTHER PUBLICATIONS

Office Action for Japanese Application No. 2019-231322 in 6 pages, dated Feb. 22, 2023.

Japanese Office Action in Application No. 2020-004295 dated Aug. 1, 2023 in 9 pages.

Japanese Office Action for application No. 2020-004295 mailed on Nov. 7, 2023.

* cited by examiner

TIMEPIECE DISPLAY PLATE, TIMEPIECE, AND METHOD OF MANUFACTURING TIMEPIECE DISPLAY PLATE

CROSS-REFERENCE TO RELATED APPLICATION

This application claims priority to Japanese patent application No. 2019-231322, filed on Dec. 23, 2019 and Japanese patent application No. 2020-004295, filed on Jan. 15, 2020, the entire contents of each of which are incorporated by reference herein in their entireties and made a part of this specification.

FIELD OF THE INVENTION

The present disclosure relates to a timepiece display plate, a timepiece, and a method of manufacturing the timepiece display plate.

BACKGROUND

A timepiece display plate (hereinafter, display plate) made of a metal material for use in, for example, a dial of a timepiece is popular because such a metal display plate offers a sense of luxury. High brightness reflection is one reason that the metal material exhibits a sense of luxury.

However, the metal display plate hardly transmits light and radio wave. For this reason, such a metal display plate cannot be used for a solar cell timepiece in which the solar cell for receiving solar light is disposed under a display plate and a wave correction timepiece in which an antenna for receiving radio wave is disposed under a display plate.

Accordingly, a display plate capable of obtaining reflection light (metal tone reflection light) similar to the reflection light by metal while transmitting light and radio wave is demanded. For example, JP2012-063342A describes such a display plate including a base capable of transmitting electromagnetic wave and a dispersion film in which metal powders are dispersed. The dispersion film is laminated on the base.

However, in the display plate described in JP 2012-063342A, the metal powders are separated from each other in the thickness direction of the dispersion film and also disposed to be parallel to the surface direction of the dispersion film. It is therefore necessary to form the dispersion film by a plurality of steps, which complicates the manufacturing process, and increases the costs.

The present disclosure has been made in view of the above circumstance, and an object of the present disclosure is to provide a timepiece display plate capable of simplifying a manufacturing process and reducing the costs, and also obtaining reflection light (metal tone reflection light) similar to reflection light by metal while transmitting light and radio wave, a timepiece, and a method of manufacturing the timepiece display plate.

SUMMARY

The present disclosure relates to a timepiece display plate including a flat plate base that transmits light, a plurality of metallic foil pieces that are disposed on one face of the base, each of the plurality of metallic foil pieces having a thin thickness that transmits the light, and a protection layer that is laminated on the one face to cover the metallic foil pieces and transmit the light.

The present disclosure relates to a timepiece display plate including a flat plate base that transmits light, a dispersion film in which a plurality of metallic foil pieces are dispersed, the metallic foil pieces reflecting the light to a resin that transmits the light, wherein the flat plate base and the dispersion film are laminated, and the dispersion film includes an opening portion without the metallic foil piece at a predetermined ratio in a planer view.

The present disclosure relates to a timepiece including the timepiece display plate according to the present disclosure as a dial.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, embodiments of a timepiece display plate, a timepiece, and a method of manufacturing the timepiece display plate according to the present disclosure will be described with reference to the drawings.

First Embodiment

Figure 1:
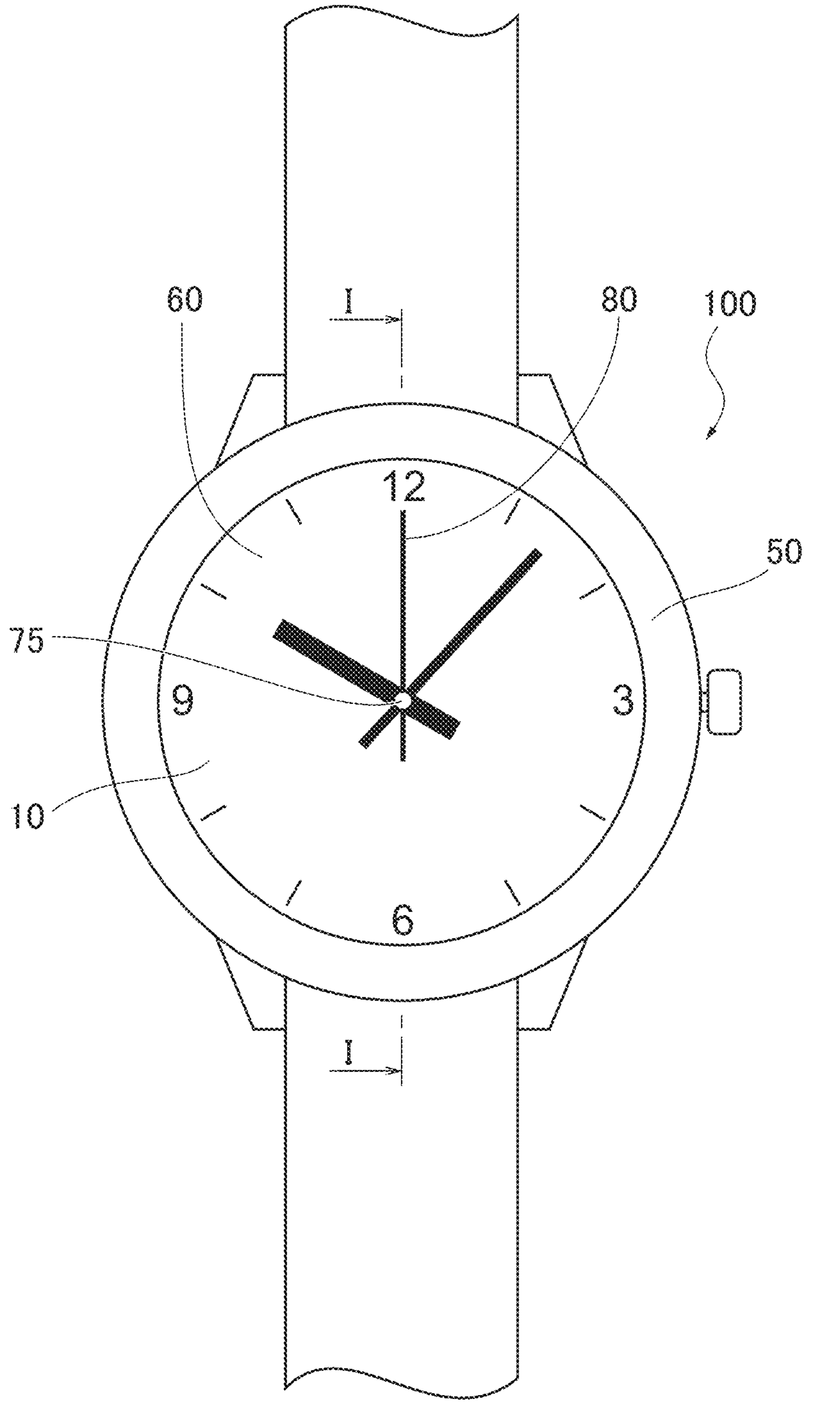
FIG. 1 is a plan view illustrating a timepiece having a dial as a first embodiment of a timepiece display plate according to the present disclosure.
Figure 2:
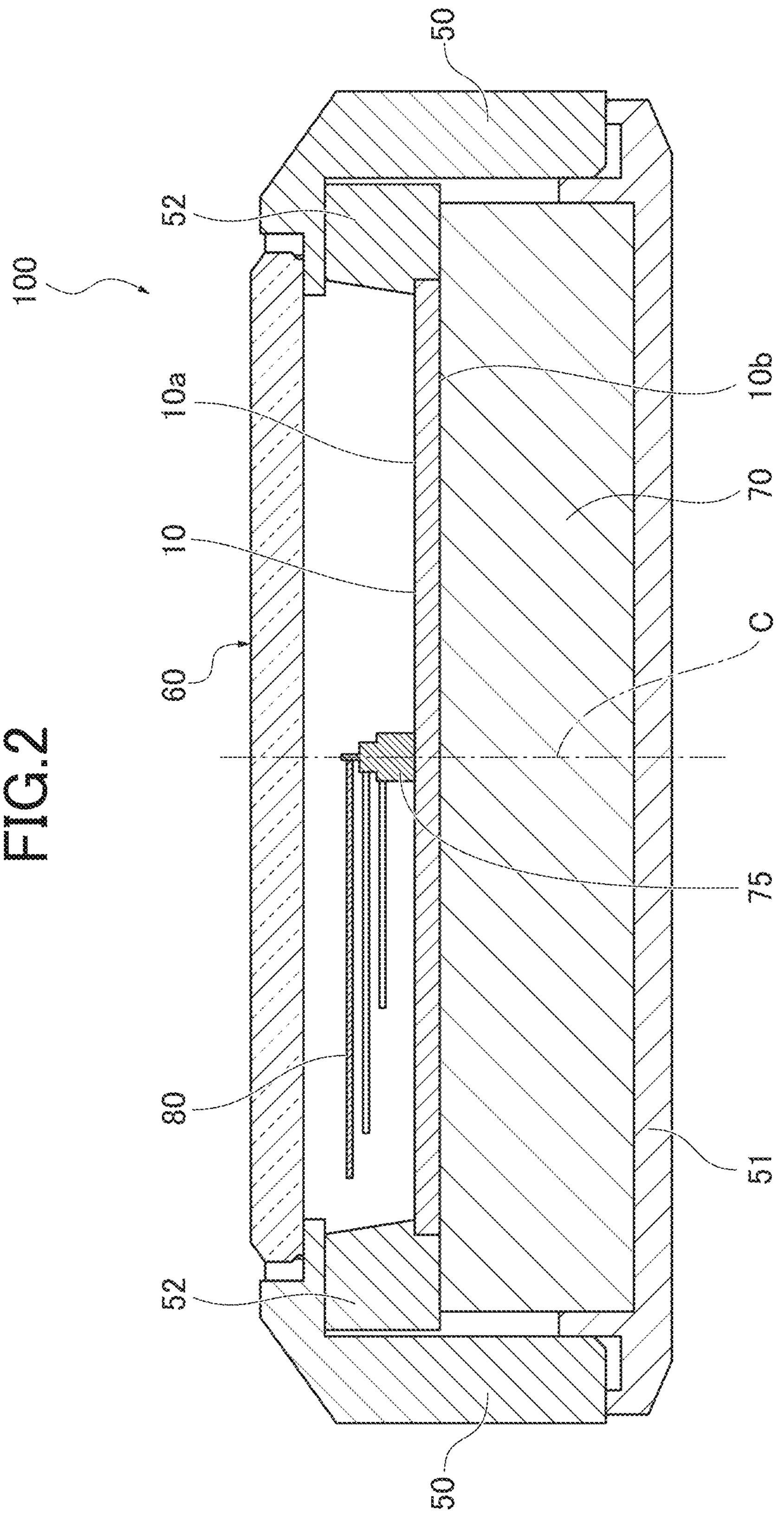
FIG. 2 is a sectional view, along an I-I line, of the timepiece illustrated in FIG. 1.

A configuration of a timepiece will be described. FIG. 1 is a plan view illustrating a timepiece 100 including a dial 10 as a first embodiment of the timepiece display plate according to the present disclosure. The timepiece 100 is the first embodiment of the timepiece according to the present disclosure. FIG. 2 is a sectional view, along an I-I line, of the timepiece 100 illustrated in FIG. 1. In addition, FIGS. 1, 2 are commonly referred in the first embodiment and a second embodiment.

As illustrated in FIGS. 1, 2, the timepiece 100 includes a metal casing 50, the dial 10, a hand 80, a dial trim ring 52, and a movement 70. The dial 10, the hand 80, the dial trim ring 52, and the movement 70 are provided inside the metal casing 50. One end of the casing 50 which corresponds to a front face of the timepiece 100 is closed by a windshield 60, and the other end of the casing 50 which corresponds to a rear face of the timepiece 100 is closed by a metal rear lid 51.

The dial trim ring 52 is disposed in a circumference rim of the dial 10. A hand shaft 75 projecting along a center C from the movement 70 disposed in the rear face of the dial 10 passes through the dial 10, and the hand 80 is fixed to the hand shaft 75. The hand 80 rotates by the rotation of the hand shaft 75 about the center C, and indicates an hour mark (index) provided on the front face of the dial 10 in accordance with the rotation position, so as to display a time.

Figure 3:
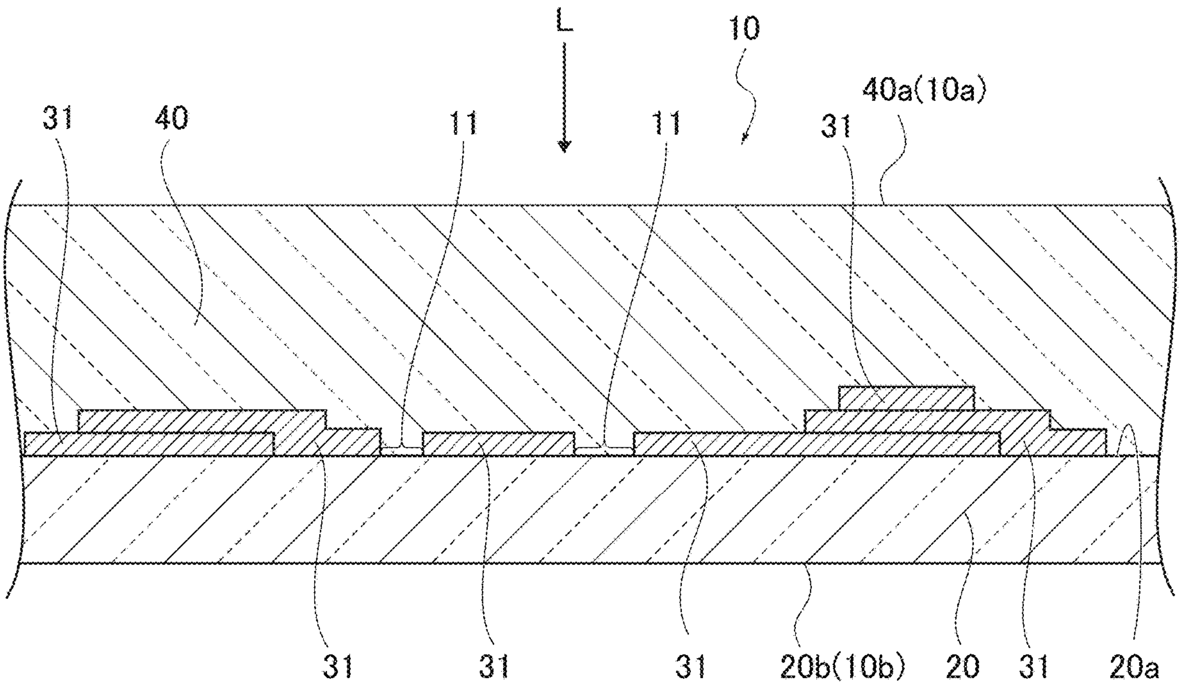
FIG. 3 is a sectional view similar to FIG. 2, illustrating the dial of the first embodiment.
Figure 4:
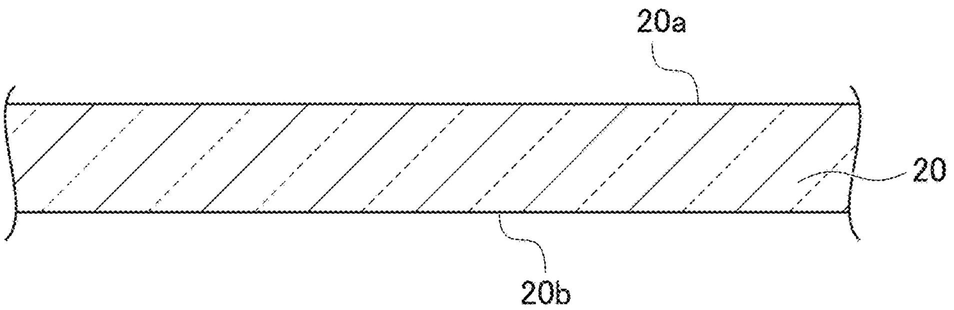
FIG. 4 is a sectional view corresponding to FIG. 3, illustrating a base in the dial.
Figure 5:
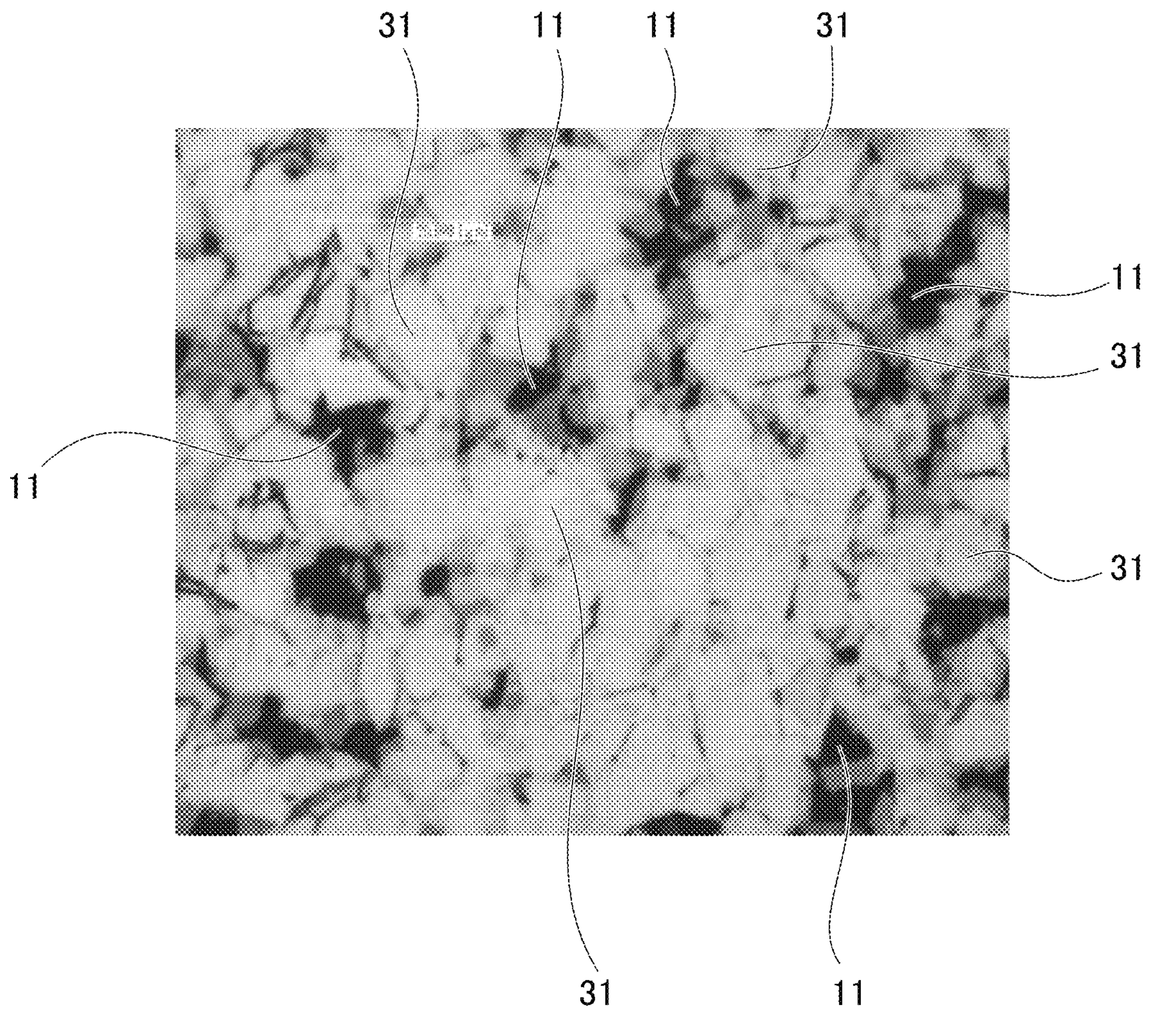
FIG. 5 is a photography showing aluminum flakes and opening portions in a planer view when observing the dial with an electron microscope, as one example.

A configuration of the dial will be described. FIG. 3 is a sectional view similar to FIG. 2, illustrating the dial 10 of the first embodiment. FIG. 4 is a sectional view corresponding to FIG. 3, illustrating a base 20 of the dial 10. In addition, FIG. 4 is also commonly referred in the first embodiment and the second embodiment. FIG. 5 is a photography showing aluminum flakes 31 and opening portions 11 in a planer view when observing the dial 10 with an electron microscope, as one example.

As illustrated in FIG. 3, the dial 10 includes, on a rear face 10*b* (close to movement 70) thereof, the base 20, on a front face 10*a* thereof, a protection layer 40, and a plurality of aluminum flakes 31 disposed between the base 20 and the protection layer 40. The base 20, the protection layer 40, and the aluminum flakes 31 are laminated.

The base 20 is made of a light transmitting material that transmits light L. The light transmitting material includes polycarbonate, for example, but it is not limited thereto as long as it has a light transmitting property. Such a material may include acrylic resin and glass. The base 20 may be colored or colorless.

As illustrated in FIG. 4, the base 20 is a plate base including the flat front face 20*a* and the flat rear face 20*b*. The base 20 has a circular external contour or an oval external contour. However, the base 20 is not limited to such external contours, and the base 20 may have an elliptical external contour or a rectangular external contour.

The base 20 has a thickness of 500 μm, for example. The thickness of the base 20 is not limited to 500 μm. The base 20 may have a thickness smaller than or larger than 500 μm, and have a thickness of 300 to 650 μm, for example, as long as the base 20 has a strength and a rigidity as the dial 10.

As illustrated in FIG. 3, a plurality of aluminum flakes 31 (aluminum foil pieces as one example of metal foil pieces) are laminated on the most part of one face (front face 20*a*) of the base 20.

The aluminum flake 31 is a minute aluminum material, and is formed as a thin foil piece having a size in a specific direction significantly smaller than that in the other direction. The aluminum flake 31 is extremely thin, and has a thickness of about 10 to 30 nm, for example. Although this thin aluminum flake 31 is a metal foil piece, it may transmit the light L.

The aluminum flake 31 has a flat smooth surface. In the example illustrated in FIG. 3, some of the aluminum flakes 31 are bent. A part of the extremely thin aluminum flake 31 is laminated on another aluminum flake 31, so that the aluminum flake 31 follows the surface of another aluminum flake 31 and the front face 20*a* of the base 20. The border part of the aluminum flake 31 is thereby bent.

As described above, a plurality of aluminum flakes 31 lie on the front face 20*a* of the base 20 such that the flat faces of the aluminum flakes 31 are arranged substantially parallel to the front face 20*a* of the base 20.

The front face 20*a* may include an opening portion 11 (refer to FIG. 3) without the aluminum flake 31 in a planar view as seen in a thickness direction from the front face 10*a* to the rear face 10*b* of the dial 10. The photography of FIG. 5 by the electron microscope shows some parts of the front face 20*a* without the aluminum flakes 31 in a planer view as the opening portions 11.

The opening portion 11 without the aluminum flake 31 in a planer view transmits the light L such as visible light from the front face 10*a* to the rear face 10*b* of the dial 10. On the other hand, some parts of the front face 20*a* with the aluminum flakes 31 in a planer view (some parts except opening portions 11) generally reflect the light L traveling from the front face 10*a* toward the rear face 10*b* of the dial 10 by the flat faces of the aluminum flakes 31.

As the aluminum flake 31 in the first embodiment is extremely thin as described above, even though about one to four aluminum flakes 31 are laminated, the aluminum flakes 31 transmit a part of the light L incident from the front face 10*a* of the dial 10 to the rear face 20*b* of the base 20. In other words, even though the front face 20*a* has no opening portion 11 (opening ratio of 0%), the transmittance of the light L to the rear face 20*b* is not 0%, i.e., a part of the light L is transmitted through the aluminum flake 31.

The protection layer 40 that covers the aluminum flakes 31 is provided on the front face 20*a* of the base 20. The protection layer 40 is made of a light transmitting material that transmits the light L. In the first embodiment, the protection layer 40 is made of resin, for example. Such resin includes not only urethan resin but also resin except the urethan resin. The protection layer 40 may be made of not only a material except the resin but also glass, for example.

Figure 6:
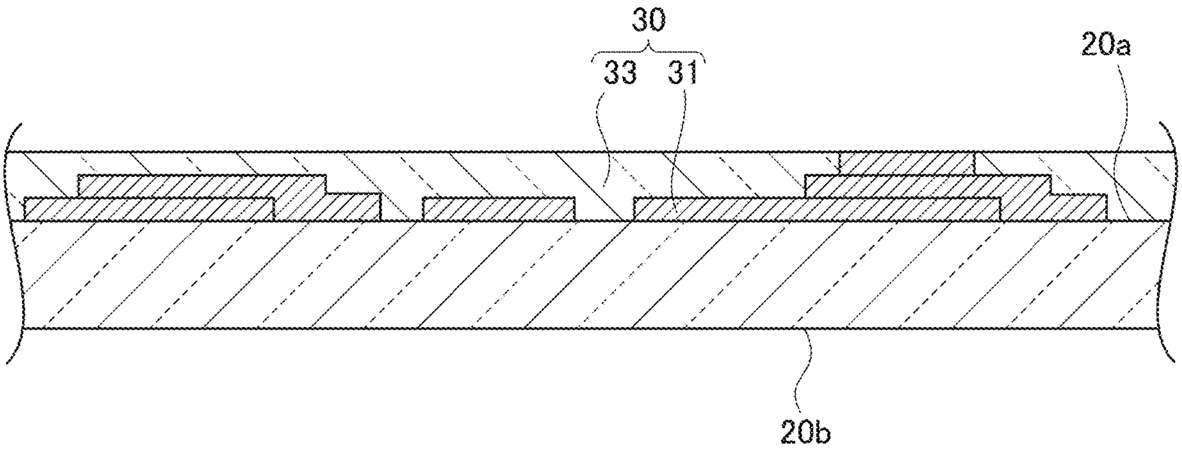
FIG. 6 is a sectional view corresponding to FIG. 3, illustrating the base just after a coating film is formed by splaying a paint onto a surface of the base in a manufacturing process of the dial.
Figure 7:
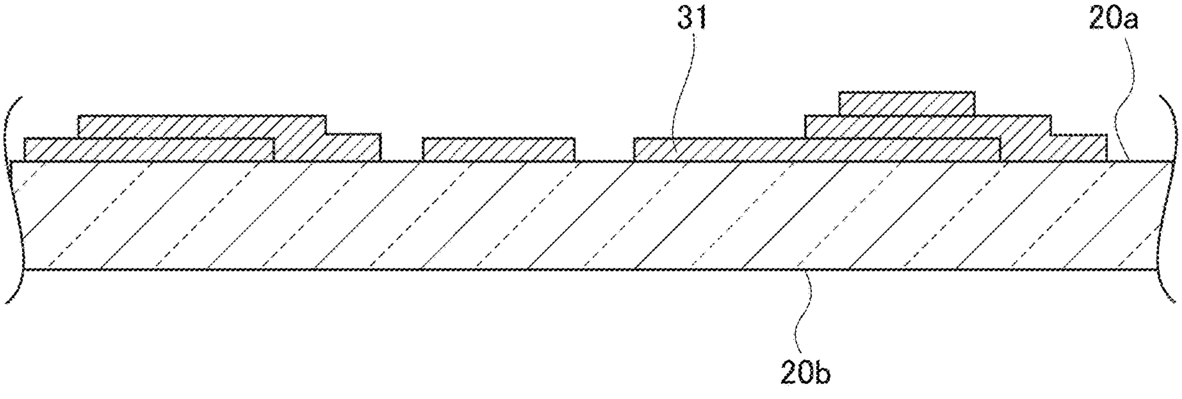
FIG. 7 is a sectional view corresponding to FIG. 6, illustrating the base from which solution of the paint is volatilized after the coating film is formed by spraying the paint onto the surface of the base in the manufacturing process of the dial.

A method of manufacturing the dial will be described. The above described dial 10 is manufactured by the following manufacture process as one example. FIG. 6 is a sectional view corresponding to FIG. 3, illustrating the base 20 just after a coating film 30 is formed by spraying a paint onto the surface of the base 20 in the manufacturing process of the dial 10. FIG. 7 is a sectional view corresponding to FIG. 6, illustrating the dial 10 in which solution 33 contained in the coating film 30 is volatilized after the coating film 30 is formed by spraying the paint onto the front face 20*a* of the base 20.

Figure 8:
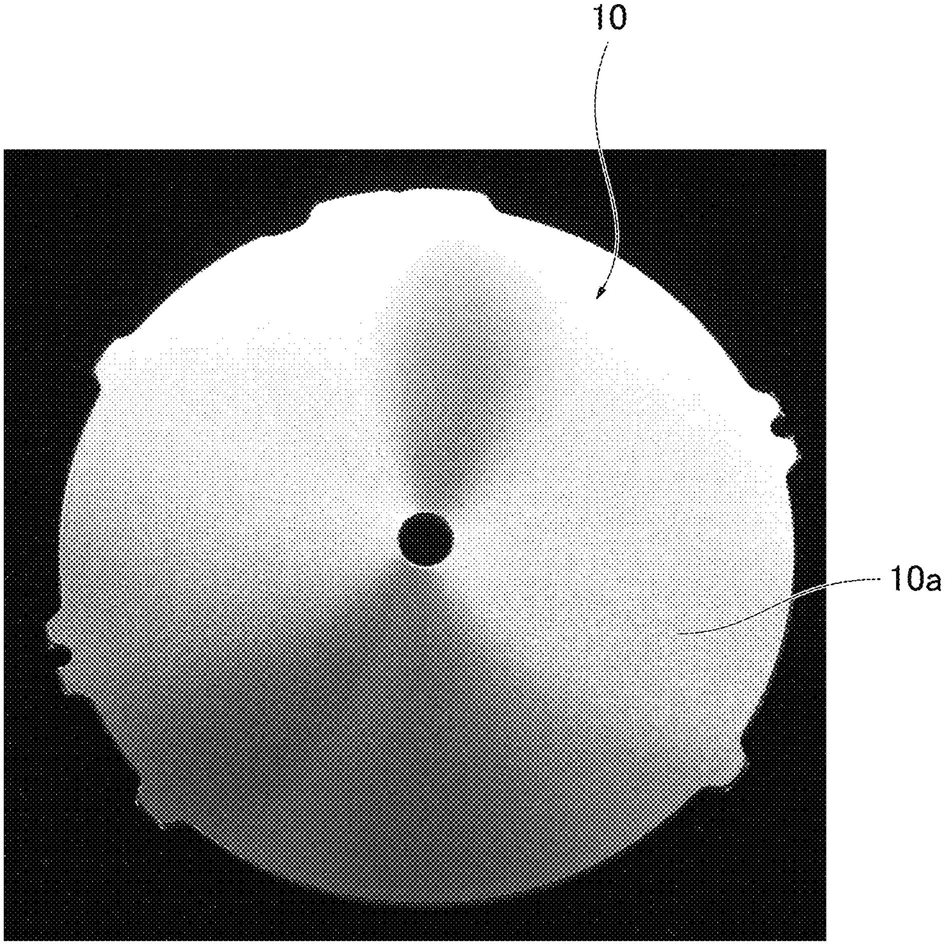
FIG. 8 is a photography showing the metal tone dial visually recognized by a viewer from a front face of the dial, as one example.

FIG. 8 is a photography showing the metal tone dial visually recognized by a viewer from the front face 10*a* of the dial 10, as one example.

At first, the paint for forming the coating film 30 on the base 20 is produced. This paint is liquid, and is produced by mixing mainly the solution (for example, thinner) 33 and the aluminum flakes 31. An additive agent that does not obstruct the volatilization of the solution 33 or an additive agent that promotes the volatilization may be added into the paint. The excess solution 33 is not required to the aluminum flakes 31 because the solution 33 is only required to disperse the aluminum flakes 31 on the surface of the base 20 as the coating film 30 to be temporarily fixed.

Next, the above described liquid paint is sprayed onto a top face of the base 20. The top face of the base 20 onto which the paint is spayed may be the front face or the rear face. Hereinafter, the top face onto which the paint is splayed is used as the front face 20*a* of the base 20.

As illustrated in FIG. 6, in the coating film 30 formed by spaying the paint, the liquid solution 33 forms the film together with the solid aluminum flakes 31 in the beginning. The aluminum flakes 31 are almost horizontally arranged. One aluminum flake 31 covers the front face 20*a* of the base 20, or the two or more aluminum flakes 31 are laminated to cover the front face 20*a* of the base 20.

Next, the dial 10 in which the coating film 30 is formed on the base 20 is heated. As illustrated in FIG. 7, the solution 33 is volatilized by this heating, so that the aluminum flakes 31 are only left on the front face 20*a* of the baes 20, and the aluminum flakes 31 are almost horizontally fixed.

The solution 33 may be volatilized by air drying (by leaving the dial 10 in an environment to be air dried according to a temperature and a humidity of the environment without actively drying the solution for volatilization).

The fixed power of the laminated aluminum flakes 31 and the fixed power of the front face 20*a* and the aluminum flakes 31 can be enhanced by adding an additive agent having an adhesive property into the paint in addition to the solution 33 and the aluminum flakes 31.

When the coating film 30 is formed, the opening ratio, which is a ratio of forming the opening portion 11, depends on the spraying amount of the paint (applying time, discharge amount, atomization pressure of coating gun, and distance to coating gun). Namely, the opening ratio decreases in accordance with the increase in the spraying amount of the paint, and the opening ratio increases in accordance with the decrease in the spraying amount of the paint.

After the solution 33 is volatilized, a resin paint is sprayed onto the front face 20*a* of the base 20 to cover at least the aluminum flakes 31, so as to form the protection layer 40 that protects the aluminum flakes 31, as illustrated in FIG. 3, when the aluminum flakes 31 are fixed onto the front face 20*a* of the base 20 (FIG. 7).

A curing agent that promotes the thermal curing of the protection layer 40 may be added into the paint for forming the protection layer 40.

The operation will be described. According to the dial 10 configured as described above, the light L incident from the front face 10*a* toward the rear face 10*b* of the dial 10 is transmitted through the protection layer 40, but is mostly reflected by the aluminum flakes 31. Namely, the light L incident on the almost horizontally arranged aluminum flakes 31 is mostly reflected by the flat faces of the aluminum flakes 31, and returns to the front face 10*a* of the dial 10.

The aluminum flakes 31, which are almost horizontally arranged, align the directions of the reflection light toward the front face 10*a* of the dial 10. The reflection light is thereby visually recognized as high brightness reflection light. A viewer can therefore visually recognize the metal tone (metallic) dial 10 from the front face 10*a* by the high brightness reflection light from the dial 10, as illustrated in FIG. 8.

In this embodiment, the aluminum flakes 31, which are laminated in the thickness direction, prevent the incident light from scattering among a plurality of aluminum flakes fixed in different positions in the dispersion film in the thickness direction, different from a dial in which the aluminum flakes are separated in the thickness direction.

The aluminum flakes 31 laminated in the thickness direction in the first embodiment can therefore improve the uniformity of the brightness of the reflection light. The opening portion 11 formed in the thickness range corresponding to the first layer of the aluminum flake 31 can be closed by the second layer or more of the aluminum flake 31 to be laminated, so that the opening ratio can be adjusted.

The aluminum flakes 31, which are extremely thin, transmit the light L at a predetermined volume. Accordingly, the light L is partially transmitted to the rear face 20*b* of the base 20 even though the dial 10 has no opening portion 11 without the aluminum flake 31.

With this configuration, even when the timepiece 100 is a solar cell timepiece in which a solar cell that generates electricity with the light L is disposed under the rear face 10*b* of the dial 10, the solar cell can be irradiated with the light L, and the solar cell timepiece can be thereby effectively operated.

Accordingly, it is possible for the dial 10 of the first embodiment to obtain the reflection light (metal tone reflection light) similar to the reflection light by metal while transmitting light and radio wave. According to the dial 10, the timepiece 10, and the method of manufacturing the dial 10 of the first embodiment, a plurality of the aluminum flakes 31, which are laminated in the thickness direction, eliminate a need for forming the layers of the aluminum flakes 31 by a plurality of steps, different from a dial in which the aluminum flakes 31 are separated in the thickness direction, and thus simplifies the manufacturing process and reduces the costs.

The extremely thin aluminum flakes 31 also transmit the radio wave. Accordingly, even when the timepiece 100 is a wave correction timepiece in which an antenna for receiving the radio wave is disposed under the rear face 10*b* of the dial 10, and the dial 10 has no opening portion 11, the antenna can receive the radio wave, and the wave correction timepiece can be thereby effectively operated.

When the extremely thin aluminum flake 31 is exposed, such an aluminum flake 31 has a little resistance to humidity, physical contact, and friction. For this reason, such an aluminum flake 31 is easily removed from the base 20. However, in the dial 10 of the first embodiment, the aluminum flakes 31 are covered by the protection layer 40, so that the aluminum flakes 31 can be protected from humidity, physical contact, and friction.

(Experimental Example) Table 1 describes an experimental example showing results of an external appearance evaluation, a transmittance (transmittance of display plate) which is a ratio at which the light L transmits from the front face 10*a* to the rear face 10*b* of the dial 10, and an overall evaluation based on these. Under the experimental example, the thickness of the protection layer 40 is changed from less than 1 μm to more than 5 μm, and the opening ratio % of the opening portion 11 is changed from less than 3% to more than 45% in a planar view of the dial 10.

TABLE 1

| THICKNESS OF PROTECTION LAYER | LESS THAN 1 μm | 1~5 μm | | | | | THICKER THAN 5 μm |
|---|---|---|---|---|---|---|---|
| OPENING RATIO | — | 45% | 40% | 8% | 6% | 3% | — |
| EXTERNAL APPEARANCE | A PART OF ALUMINUM FLAKE IS EXPOSED | GOOD SLIGHT TRANSLUCENCY | EXCELLENT METAL TONE | EXCELLENT METAL TONE | EXCELLENT METAL TONE | EXCELLENT METAL TONE | COATING FEELING |
| TRANSMISSION | — | EXCELLENT 50% | EXCELLENT 40% | EXCELLENT 30% | EXCELLENT 15% | GOOD 10% | — |
| OVERALL EVALUATION | BAD | GOOD | EXCELLENT | EXCELLENT | EXCELLENT | GOOD | BAD |

The transmittance increases in accordance with the increase in the opening ratio whereas the transmittance decreases in accordance with the decrease in the opening ratio. However, the transmittance does not reach 0% even when the opening ratio is 0%, as described above. Accordingly, the transmittance of the light L is easily secured even though the number of opening portions 11 is decreased.

When the opening portions 11 are largely distributed in the dial 10, the reflection light volume is reduced, which is likely to offer the rough feeling (granular quality) from the dial 10. However, the dial 10 of the first embodiment, which increases the transmittance of the light L without increasing the opening ratio, hardly offers the rough feeling. Moreover, the aluminum flakes 31, which are almost horizontally arranged in a simple way, improves the smoothness, and offers the high brightness reflection light having shiny appearance such as a plating metal.

Furthermore, the dial 10 of the first embodiment, which includes a downsized side face (thickness face) by the extremely thin aluminum flake 31, makes it difficult to occur the scattering by the reflection at the side face, and thus controls the rough feeling. When the transmittance increases, the transmitting light volume to the rear face 10*b* of the dial 10 increases, and the light volume that reaches the solar cell which may be disposed under the rear face 10*b* of the dial 10 increases, and the radio wave that reaches the antenna which may be disposed under the rear face 10*b* of the dial 10 increases.

On the other hand, when the transmittance decreases, the ratio of the reflection light by the aluminum flakes 31 increases. The metal feeling of the dial 10 thereby improves while the transmitting light volume to the rear face 10*b* of the dial 10 decreases. Accordingly, the light volume that reaches the solar cell which may be disposed under the rear face 10*b* of the dial 10 decreases, and also the radio wave that reaches the antenna which may be disposed under the rear face 10*b* of the dial 10 decreases.

In the experimental example shown in Table 1, the transmittance of the light L of 10 to 50% can be maintained in the range of the opening ratio of 3 to 45%. With the transmittance of the light L of 10 to 50%, the light L can be sufficiently supplied to the rear face 10*b* of the dial 10, and the metal tone external appearance can be obtained. Accordingly, it is preferable for a predetermined opening ratio, as one example, to be in a range of 3 to 45% as the overall evaluation (good or excellent in Table 1). In addition, it is preferable for the thickness of the protection layer 40 to be in a range of 5 to 1 μm in the experimental example in accordance with the opening ratio of 3 to 45%.

When the thickness of the protection layer 40 is less than 1 μm, the aluminum flakes 31 may be exposed. When the thickness of the protection layer 40 is more than 5 μm, the thickness of the protection layer 40 increases, resulting in the strengthening in the coating feeling on the metal tone surface, which weakens the metal feeling.

In a range of the opening ratio of 6 to 40%, the metal tone external appearance without translucency can be obtained while maintaining the transmittance of more than 15%. As a result, it is preferable for the opening ratio to be in the range of 6 to 40% as one example (excellent in Table 1).

In the above experimental example, the thickness of the aluminum flake 31 was 10 to 30 nm. However, the size except the thickness was about several to 30 μm (mean value 10 to 20 μm).

The extremely thin thickness of the aluminum flake 31, which is about 10 to 30 μm, makes it easy to follow the surface of another aluminum flake 31 and the contour shape of the front face 20*a* of the base 20 even though the aluminum flake 31 is made of metal.

Accordingly, even when an uneven pattern for use as the dial 10 is provided on the front face 20*a* of the base 20, the aluminum flakes 31 laminated on the front face 20*a* do not render futile the uneven pattern of the front face 20*a*, and the reflection light corresponding to the uneven shape following the minute unevenness on the front face 20*a* can be emitted. The uneven pattern includes Hairline Finish (uneven pattern by extremely minute groove), a radial pattern, an embossed pattern, and a sand pattern.

(First Modified Example) The dial 10 of the first embodiment includes the colorless transparent protection layer 40, but may include the colored transparent protection layer 40. The yellowish protection layer 40 can obtain gold reflection light by the superimposition of the silver reflection light from the aluminum flakes 31 and the yellow of the protection layer 40. The color of the protection layer 40 is not limited to yellow, and another color can be used.

Figure 9:
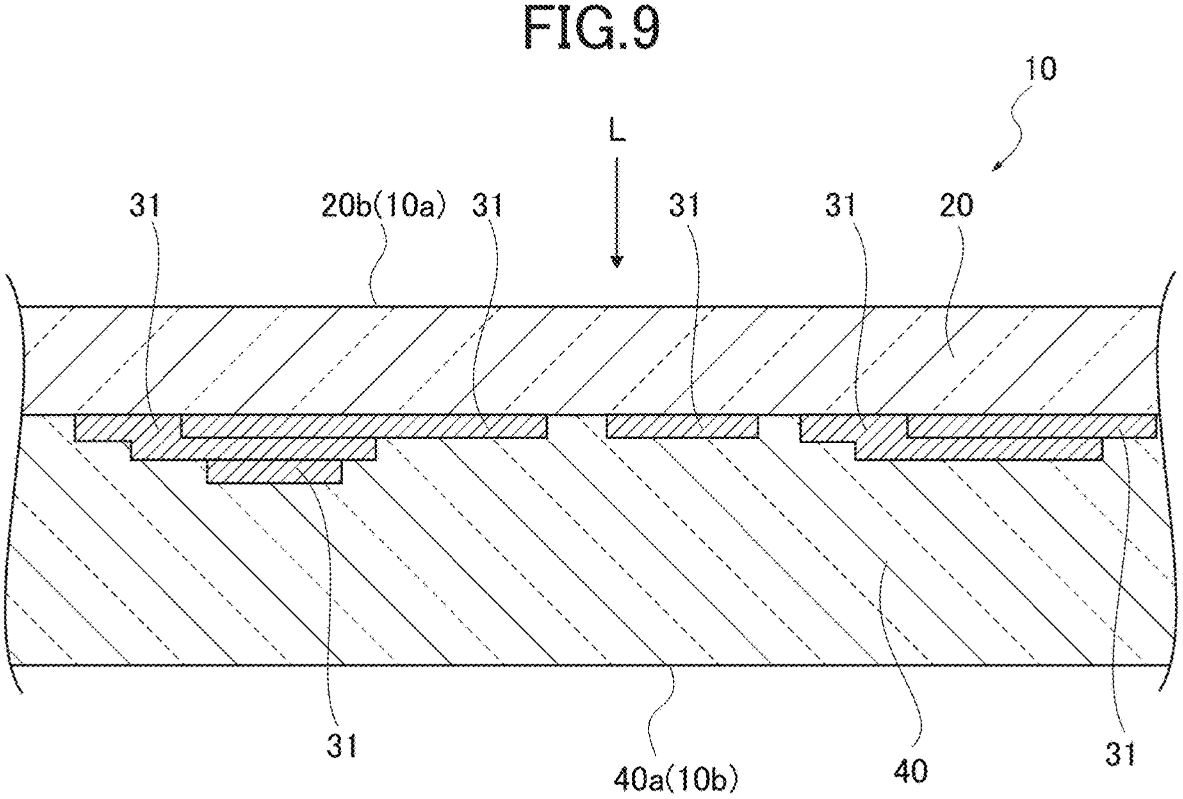
FIG. 9 is a sectional view corresponding to FIG. 3, illustrating a second modified example of the dial of the first embodiment.

(Second Modified Example) FIG. 9 is a sectional view corresponding to FIG. 3 illustrating the second modified example of the dial 10 of the first embodiment. In the dial 10 of the first embodiment, the aluminum flakes 31 are provided on the front face 20*a* of the base 20, and the front face 40*a* of the protection layer 40 corresponds to the front face 10*a* of the dial 10. However, as illustrated in FIG. 9, in the timepiece display plate according to the present disclosure, the base 20 may be provided on the front face 10*a* of the dial 10, and the protection layer 40 may be provided on the rear face 10*b* of the dial 10.

Namely, the dial 10 illustrated in FIG. 9 includes the front face and the rear face opposite to the front face and the rear face of the dial 10 illustrated in FIG. 3 such that the rear face 20*b* of the base 20 in FIG. 3 is the front face 10*a* of the dial 10 and the front face 40*a* of the protection layer 40 in FIG. 3 is the rear face 10*b* of the dial 10.

Even when the lamination order of the base 20 and the protection layer 40 in the dial 10 is changed as described above, the effects similar to those of the dial 10 and the timepiece 100 of the first embodiment can be obtained.

In this case, the base 20 may be colored instead of coloring the protection layer 40 in the dial 10 illustrated in FIG. 3.

Figure 10:
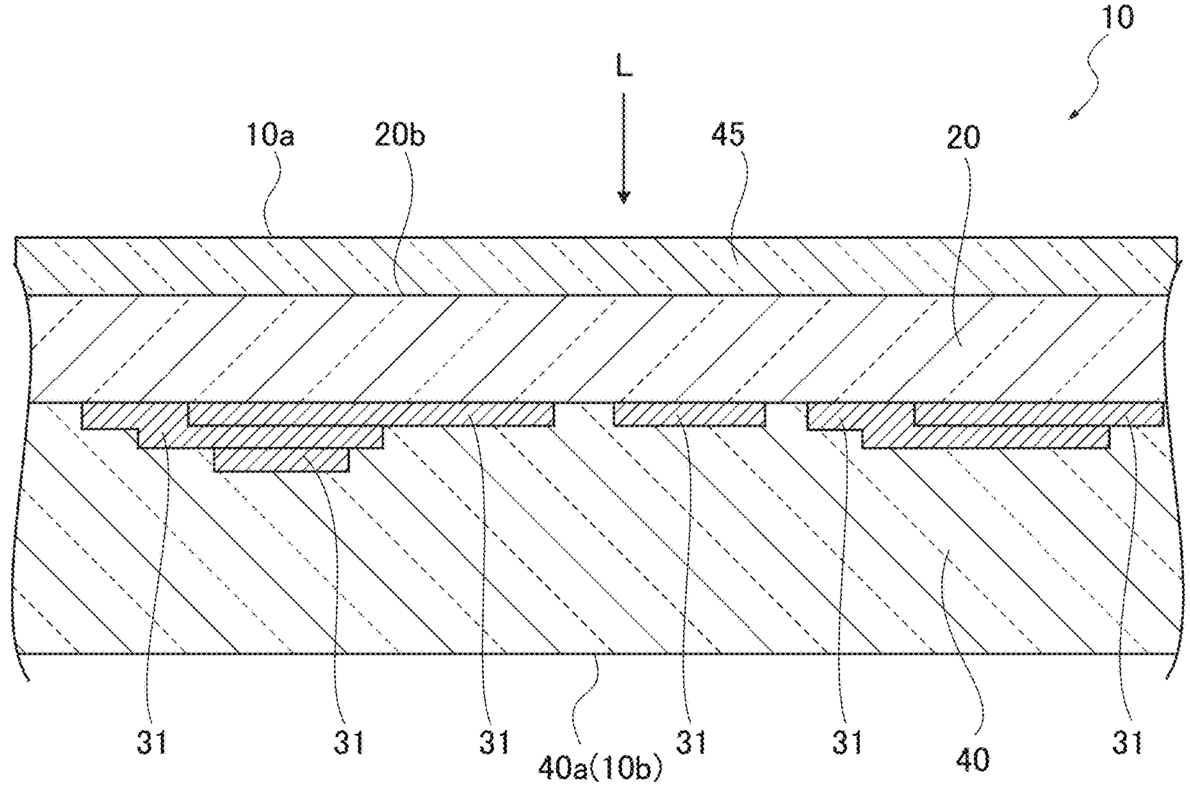
FIG. 10 is a sectional view corresponding to FIG. 3, illustrating a third modified example of the dial of the first embodiment.

(Third Modified Example) FIG. 10 is a sectional view corresponding to FIG. 3, illustrating a dial 10 of the third modified example in which a topcoat 45 is further provided on the rear face 20*b* of the base 20 of the dial 10 of the second modified example.

As described above, with the configuration in which the topcoat 45 is laminated on the base 20, the effects similar to those of the dial 10 and the timepiece 100 of the first embodiment can be obtained, and the color of the dial 10 can be changed by changing the color of the topcoat 45 only while standardizing the basic structural portions of the dial 10 such as the base 20 and the protection layer 40.

When the topcoat 45 has a special function (for example, UV cut function and IR cut function), the dial 10 can be prevented from being burned by the sun and being a high temperature.

In the dial 10 of the first embodiment and the modified examples, the aluminum flakes 31 are used as the metal foil pieces which are disposed on the front face 20*a* of the base 20. However, another metal foil piece different from the aluminum or the aluminum alloy can be used instead of the aluminum flakes 31 in the timepiece display plate according to the present disclosure. Metal thin pieces which are colored by a painting process, a vapor disposition process, or another surface process may also be used.

Second Embodiment

Figure 11:
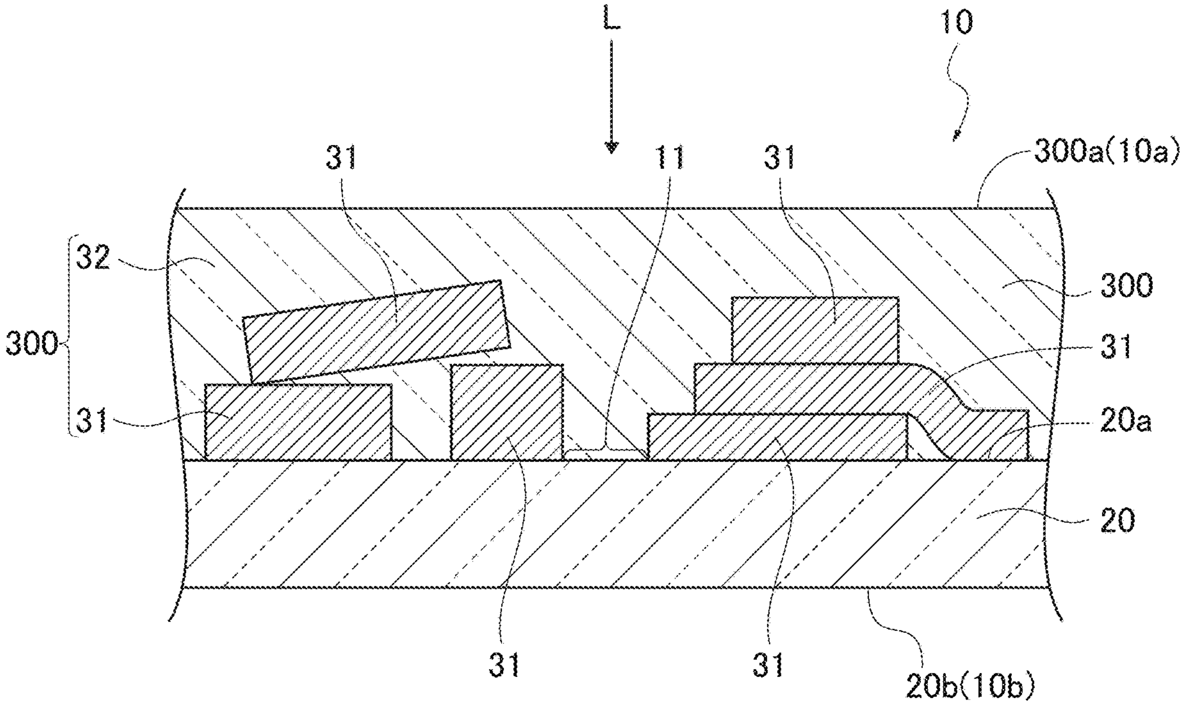
FIG. 11 is a sectional view similar to FIG. 2, illustrating a dial of a second embodiment.
Figure 12:
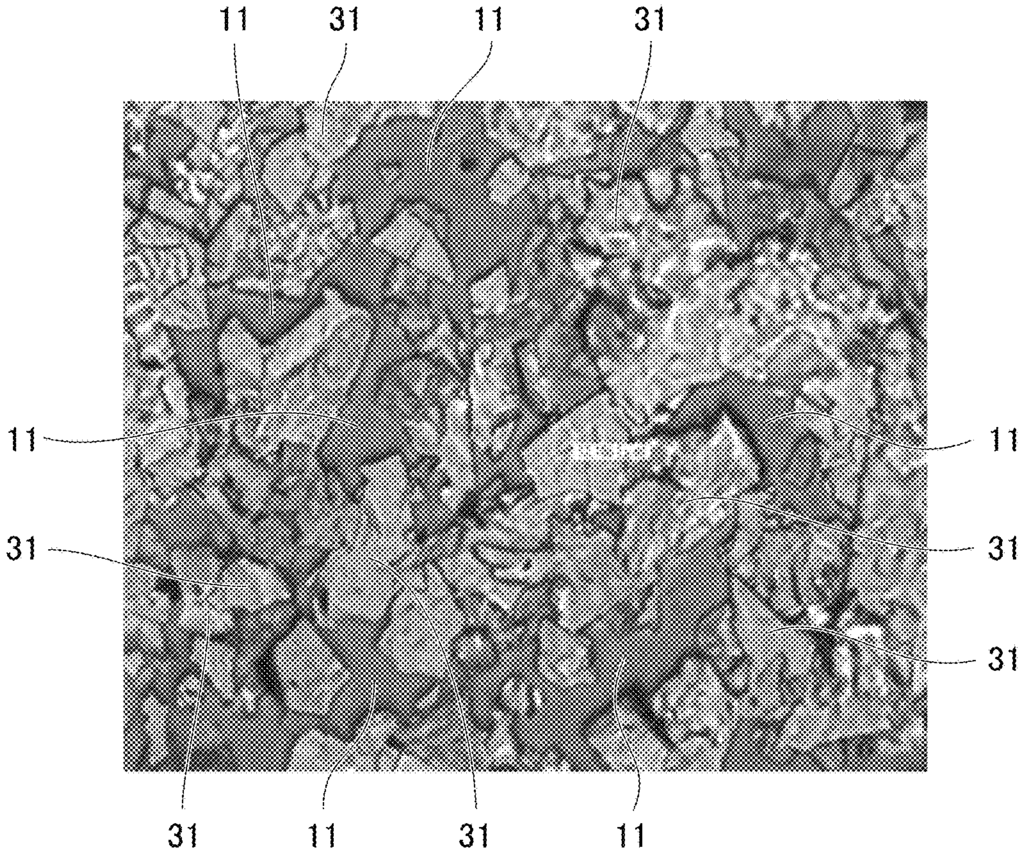
FIG. 12 is a photography showing aluminum flakes and opening portions in a planer view when observing the dial with an optical microscope, as one example.

FIG. 11 is sectional view similar to FIG. 2, illustrating a dial 10 of the second embodiment. In addition, as a basic configuration of a timepiece of the second embodiment is the same as the configuration of the timepiece of the first embodiment illustrated in FIGS. 1, 2, the description thereof is omitted. A sectional view corresponding to FIG. 11, illustrating a base 20 of the dial 10 of the second embodiment is the same as FIG. 4. FIG. 12 is a photography showing aluminum flakes 31 and opening portions 11 in a planar view when observing the dial 10 with an electron microscope, as one example. In the second embodiment, the same reference numbers are applied to the same components as those in the first embodiment. Hereinafter, in the second embodiment, the description will be omitted for the components which are the same as the components described in the first embodiment.

As illustrated in FIG. 11, the dial 10 includes, on a rear face 10*b* (close to movement 70) thereof, the base 20 and, on a front face 10*a* thereof, a dispersion film 300 that is laminated on the base 20.

As illustrated in FIG. 11, the dispersion film 300 is provided on one face (front face 20*a*) of the base 20. The dispersion film 30 is made of a resin 32 having a light transmitting property that transmits the light L and a plurality of aluminum flakes 31 (aluminum foil pieces as one example of metal foil pieces). The resin 32 includes urethan resin, but may include resin except the urethan resin.

The aluminum flake 31 is a minute aluminum material, and is formed as a thin foil piece having a size in a specific direction significantly smaller than that in another direction. The thickness of the aluminum flake 31 is 1 μm or less, for example.

The aluminum flake 31 has a flat smooth surface. In the example illustrated in FIG. 11, some of the aluminum flakes 31 are bent. A part of the extremely thin aluminum flake 31 is laminated on another aluminum flake 31, so that the aluminum flake 31 follows the surface of another aluminum flake 31 and the front face 20*a* of the base 20. The border part of the aluminum flake 31 is thereby bent.

As described above, a plurality of aluminum flakes 31 are dispersed in the dispersion film 300. The aluminum flakes 31 lie in the dispersion film 300 such that the flat face of the aluminum flake 31 is substantially parallel to the front face 20*a* of the base 20.

The dispersion film 300 includes opening portions 11 (refer to FIG. 11) without the aluminum flakes 31 at a predetermined ratio in a planar view as seen in the thickness direction from the front face 10*a* to the rear face 10*b* of the dial 10. The photography of FIG. 12 by the electron microscope shows some parts of the front face 20*a* without the aluminum flakes 31 in a planer view as the opening portions 11.

In the dispersion film 300, the opening portions 11 without the aluminum flakes 31 in a planar view transmit the light L such as visible light from the front face 10*a* to the rear face 10*b* of the dial 10. On the other hand, in the dispersion film 300, the portions with the aluminum flakes 31 (portions except opening portions) in a planar view reflect the light L traveling from the front face 10*a* to the rear face 10*b* of the dial 10 by the flat faces of the aluminum flakes 31.

Figure 13:
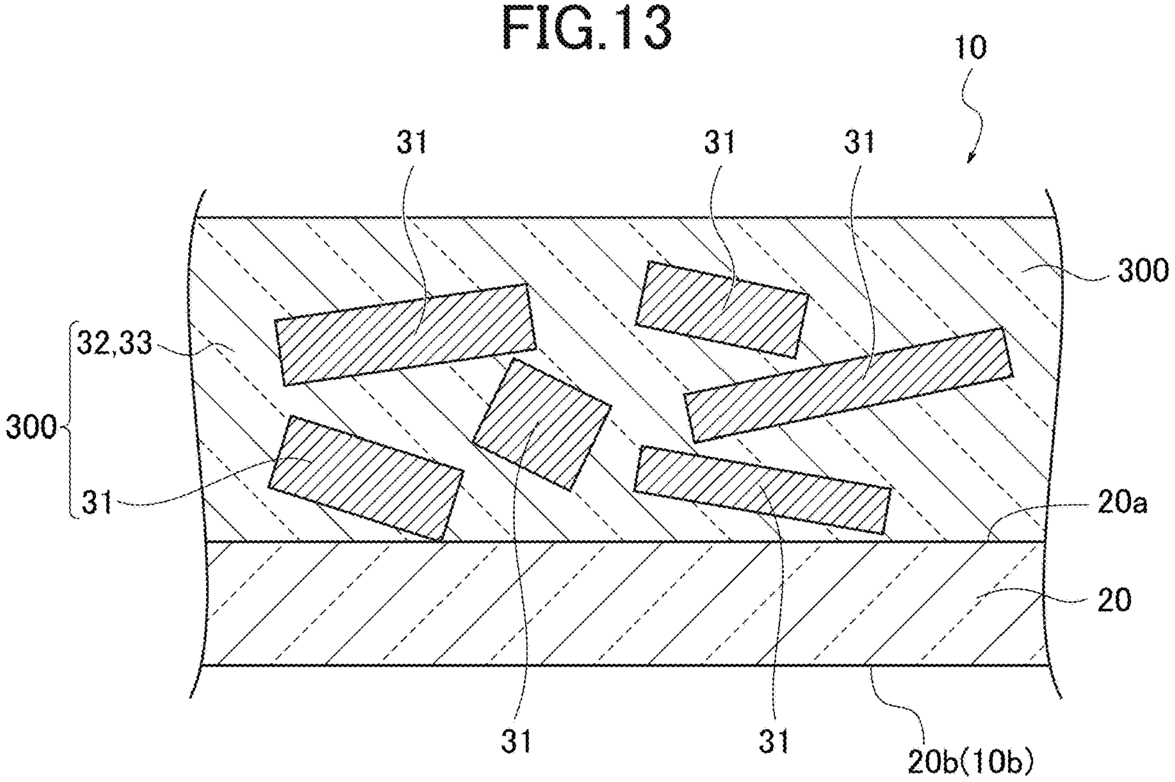
FIG. 13 is a sectional view corresponding to FIG. 11, illustrating a base just after a dispersion film is formed by spraying a paint onto a surface of the base in a manufacturing process of the dial.
Figure 14:
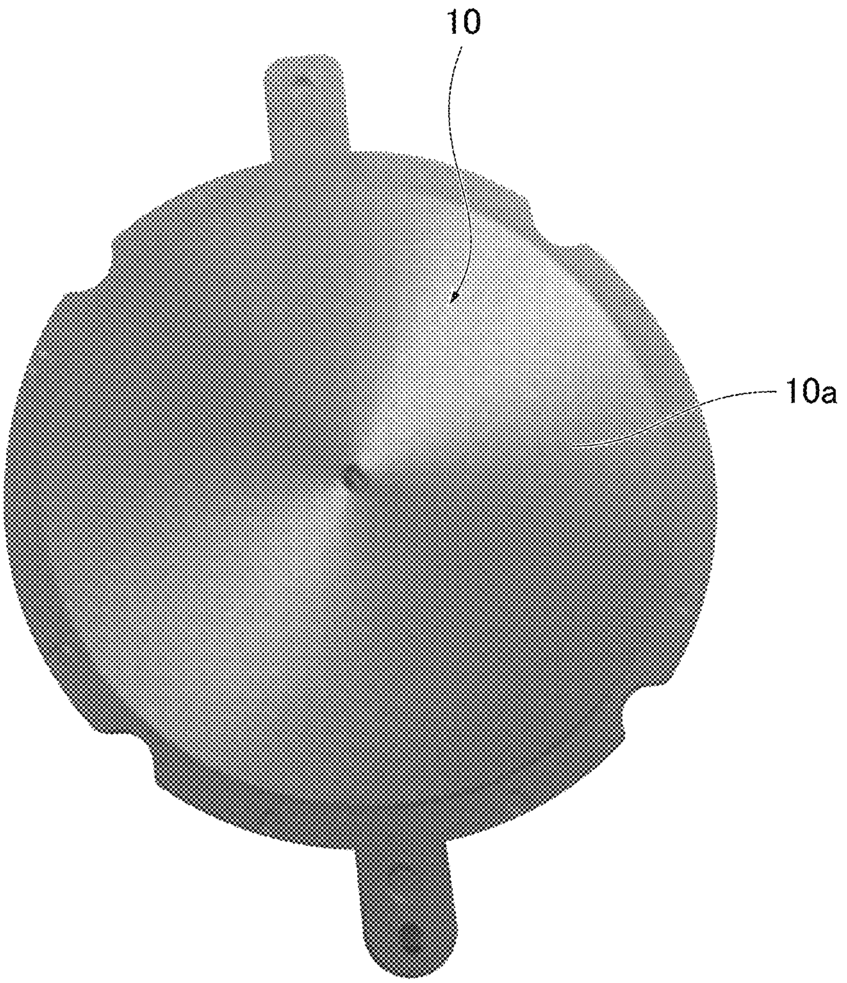
FIG. 14 is a photography showing the metal tone dial visually recognized by a viewer from a front face of the dial, as one example.

A method of manufacturing the dial will be described. The above dial 10 is manufactured by the following manufacturing process as one example. FIG. 13 is a sectional view corresponding to FIG. 3 just after the dispersion film 300 is formed by spraying a paint onto the surface of the base 20 in the manufacturing process of the dial 10. FIG. 14 is a photography showing the metal tone dial 10 visually recognized by a viewer from the front face 10*a* of the dial 10 as one example.

At first, the paint for forming the dispersion film 300 is produced. This liquid paint is formed by mixing mainly solution (for example, thinner) 33, the resin 32, and the aluminum flakes 31. A small amount of curing agent may be added into the paint to promote the thermal curing of the resin 32.

Next, the above liquid paint is sprayed onto the top face of the base 20. The top face of the base 20 onto which the paint is spayed may be a front face or a rear face. However, hereinafter, the top face onto which the paint is sprayed is used as the front face 20*a* of the base 20.

As illustrated in FIG. 13, in the dispersion film 300 formed by spraying the paint, in the beginning, the solid aluminum flakes 31 float in the liquid solution 33 and resin 32, and the aluminum flakes 31 are irregularly arranged.

The dial 10 in which the dispersion film 300 is formed on the base 20 is then heated. The solution 33 is volatilized by the heating, and the thickness of the dispersion film 300 is reduced to be thinner than that in the beginning of the spraying (FIG. 13), and the resin 32 is thermally cured.

As the thickness of the liquid in which the aluminum flakes 31 float is reduced by the volatilization of the solution 33, the aluminum flakes 31 lie to be substantially parallel in the dispersion film 300, and the aluminum flakes 31 are almost horizontally fixed by thermally curing the resin 32, as illustrated in FIG. 11.

The opening portions 11 are formed in the dispersion film 300 mainly depending on the blending amount of the aluminum flakes 31 in the paint for forming the dispersion film 300 (ratio (e.g. percentage) of aluminum flakes 31 to total of resin 32 and aluminum flakes 31) and the thickness of the dispersion film 300 (after cured) to be formed.

For example, the opening ratio %, which is a ratio of the area of the opening portions 11 to the entire area, in a planer view of the dial 10 can be changed by fixing the blending amount of the aluminum flakes 31 and changing the thickness of the dispersion film 300, for example.

An operation will be described. According to the dial 10 configured as described above, the light L incident from the front face 10*a* to the rear face 10*b* of the dial 10 is transmitted through the resin 32 in the dispersion film 300, but is not transmitted through the aluminum flakes 31 in the dispersion film 300. The light L incident on the flat aluminum flakes 31 in the dispersion film 300 from the front face 10*a* is reflected by the flat faces of the aluminum flakes 31, and returns to the front face 10*a*.

The aluminum flakes 31, which are almost horizontally arranged in the dispersion film 300, align the directions of the reflection light toward the front face 10*a* to be visually recognized as high brightness reflection light. As shown in FIG. 14, the high brightness reflection light from the dial 10 can offer the metal tone (metal feeling) dial 10 to a viewer who visually recognizes the dial 10 from the front face 10*a*.

The aluminum flakes 31 in the dispersion film 300, are laminated in the thickness direction, prevent the incident light from scattering among a plurality of aluminum flakes fixed in different positions in the thickness direction of the dispersion film, different from a dial in which the aluminum flakes are separated in the thickness direction.

The dispersion film 300 of the second embodiment can thus improve the uniformity of the brightness of the reflection light. The opening portion 11 formed in the first layer of the aluminum flake 31 may be closed by the second layer or more of the aluminum flake 31 to be laminated, so that the opening ratio can be adjusted.

On the other hand, as the opening portions 11 are formed at a predetermined ratio, a part of the light L incident from the front face 10*a* toward the rear face 10*b* of the dial 10 is transmitted through the opening portions 11 and the base 20 to reach the rear face 10*b* of the dial 10. With this configuration, even when the timepiece 100 is a solar cell timepiece in which a solar cell that generates electricity by the light L is disposed under the rear face 10*b* of the dial 10, the solar cell can be irradiated with the light L, and the solar cell timepiece can be effectively operated.

Accordingly, it is possible for the dial 10 of the second embodiment to obtain the reflection light (metal tone reflection light) similar to the reflection light by metal while transmitting the light and the radio wave. According to the dial 10, the timepiece 100, and the method of manufacturing the dial 10 in the second embodiment, the aluminum flakes 31 in the dispersion film 300, which are laminated in the thickness direction, eliminate the need for forming the dispersion film by a plurality of steps, different from a dial in which the aluminum flakes are separated in the thickness direction, and simplifies the manufacturing process and reduces the costs.

The opening portions 11 also transmits the radio wave. Accordingly, even when the timepiece 100 is a wave correction timepiece in which an antenna that receives radio wave is disposed under the rear face 10*b* of the dial 10, the antenna can receive the radio wave, and the wave correction timepiece can be thereby effectively operated.

(Experimental Example) Table 2 describes an experimental example showing results of an external appearance evaluation, a transmittance (transmittance of display plate) which is a ratio at which the light L transmits from the front face 10*a* to the rear face 10*b* of the dial 10, and an overall evaluation based on these. Under the experimental example, the blending amount of the aluminum flakes 31 is fixed to 1.7%, the discharge of the paint is set to 5 to 30 ml/min, the thickness of the dispersion film 300 is changed from less than 1 μm to more than 5 μm, and the opening ratio % of the opening portions 11 is changed from less than 10% to more than 50%.

TABLE 2

| THICKNESS OF DISPERSION FILM | LESS THAN 1 μm | 1~5 μm | | | | | THICKER THAN 5 μm |
|---|---|---|---|---|---|---|---|
| BLENDING AMOUNT OF ALUMINUM FLAKE | — | 1.70% | | | | | — |
| DISCHARGE | — | 5~30 ml/min | | | | | — |
| OPENING RATIO | — | 50% | 40% | 30% | 15% | 10% | — |
| EXTERNAL APPEARANCE | BAD A PART OF ALUMINUM FLAKE IS EXPOSED | GOOD SLIGHT TRANS-LUCENCY | EXCELLENT METAL TONE | EXCELLENT METAL TONE | EXCELLENT METAL TONE | EXCELLENT METAL TONE | BAD COATING FEELING |
| TRANSMISSION | — | EXCELLENT 50% | EXCELLENT 40% | EXCELLENT 30% | EXCELLENT 15% | GOOD 10% | — |
| OVERALL EVALUATION | BAD | GOOD | EXCELLENT | EXCELLENT | EXCELLENT | GOOD | BAD |

As the blending amount of the aluminum flakes 31 is fixed, the opening ratio deceases in accordance with the increase in the thickness of the dispersion film 300 whereas the opening ratio increases in accordance with the decrease in the thickness of the dispersion film 300. The transmittance increases in accordance with the increase in the opening ratio whereas the transmittance decreases in accordance with the decrease in the opening ratio.

When the transmittance increases, the ratio of the reflection light by the aluminum flakes 31 decreases. In this case, the dial 10 deteriorates its external appearance to be the translucent external appearance which weakens the metal feeling while the transmittance light volume to the rear face 10*b* of the dial 10 increases, the light volume that reaches the solar cell which may be disposed under the rear face 10*b* of the dial 10 increases, and the radio wave that reaches the antenna which may be disposed under the rear face 10*b* of the dial 10 increases.

On the other hand, when the transmittance decreases, the ratio of the reflection light by the aluminum flakes 31 increases. In this case, the dial 10 improves its metal feeling while the transmittance light volume to the rear face 10*b* of the dial 10 decreases, the light volume that reaches the solar cell which may be disposed under the rear face 10*b* of the dial 10 decreases, and the radio wave that reaches the antenna which may be disposed under the rear face 10*b* of the dial 10 decreases.

In the experimental example illustrated in Table 2, the transmittance of the light L of 10 to 50% can be maintained in the range of the opening ratio of 10 to 50%. With the transmittance of the light L of 10 to 50%, the light L can be sufficiently supplied to the rear face 10*b* of the dial 10, and the metal feeling external appearance can be obtained. It is therefore preferable for a predetermined opening ratio to be in the range of 10 to 50% as the overall evaluation (good and excellent in Table 2). The thickness of the dispersion film 300 corresponding to the opening ratio of 10 to 50% is 5 to 1 μm in the experimental example.

The metal feeling external appearance without translucency can be obtained and the transmittance of 15% or more can be maintained in the range of the opening ratio of 15 to 40%. It is therefore more preferable for the predetermined opening ratio to be in the range of 15 to 40% as the overall evaluation (excellent in Table 2). In addition, the thickness of the dispersion film 300 corresponding to the opening ratio of 15 to 40% is 4 to 2 μm in the experimental example.

In the above experimental example, the thickness of the aluminum flake 31 was 1 μm or less, in particular, 0.08 to 0.62 μm. The preferable thickness of the dispersion film 300 as the overall evaluation is 1.6 (=1/0.62) to 62.5 (=5/0.08) times the thickness of the aluminum flake 31. Accordingly, the preferable thickness of the dispersion film 300 as the overall evaluation is 1.6 to 62.5 times the thickness of the aluminum flake 31.

In addition, the more preferable thickness of the dispersion film 300 as the overall evaluation may be 3.2 (=2/0.62) to 50 (=4/0.08) times the thickness of the aluminum flake 31.

The aluminum flake 31, which is extremely thin of 1 μm or less, makes it easy to follow the surface of another aluminum flake and the contour shape of the front face 20*a* of the base 20 even though the metal aluminum flake is used.

Accordingly, even when, for example, an uneven pattern is formed on the front face 20*a* of the base 20, the aluminum flake 31 laminated onto the front face 20*a* does not render futile the uneven pattern of the front face 20*a*, and the reflection light corresponding to the uneven shape following the minute unevenness of the front face 20*a* can be emitted. The uneven pattern includes Hairline Finish (uneven pattern formed by extremely minute grooves, for example), a radial pattern, an embossed pattern, and a sand pattern.

In the above described experimental example, the blending amount of the aluminum flakes 31 was 1.7%. However, the blending amount is not limited to 1.7%. It is preferable for the blending amount to be in the range of 1.5 to 2.0%, for example. When the blending amount of the aluminum flakes 31 is in the range of 1.5 to 2.0%, the opening ratio is easily controlled according to the thickness of the dispersion film 300. However, the blending amount of the aluminum flakes 31 is not limited to this preferable range.

In the above described experimental example, the blending amount of the aluminum flakes 31 was fixed to 1.7% to change the opening ratio according to the thickness of the dispersion film 300. However, the thickness of the dispersion film 300 may be fixed to change the opening ratio according to the blending amount of the aluminum flakes 31.

Figure 15:
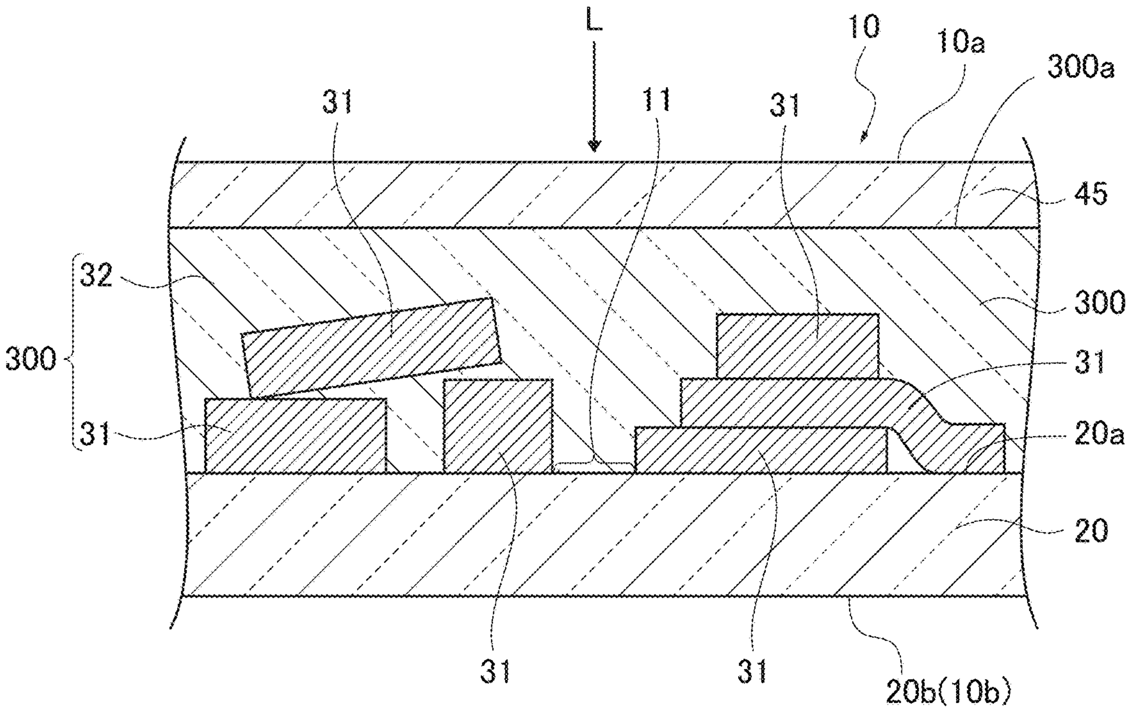
FIG. 15 is a sectional view corresponding to FIG. 11, illustrating a first modified example of the dial of the second embodiment.

(First Modified Example) FIG. 15 is a sectional view corresponding to FIG. 11, illustrating the first modified example of the dial 10 of the second embodiment. In the dial 10 of the above second embodiment, the dispersion film 300 is laminated on the front face 20*a* of the base 20, and the front face 300*a* of the dispersion film 300 corresponds to the front face 10*a* of the dial 10. However, in the timepiece display plate according to the present disclosure, as illustrated in FIG. 15, a topcoat 40 that transmits the light L may be laminated on the front face 300*a* of the dispersion film 300.

With the configuration in which the topcoat 40 is laminated as described above, the effects similar to those of the dial 10 and the timepiece 100 of the above second embodiment can be obtained, and the color of the dial 10 can be changed by changing only the color of the topcoat 40 while standardizing the basic structural portions of the dial 10 such as the dispersion film 300 and the base 20.

Figure 16:
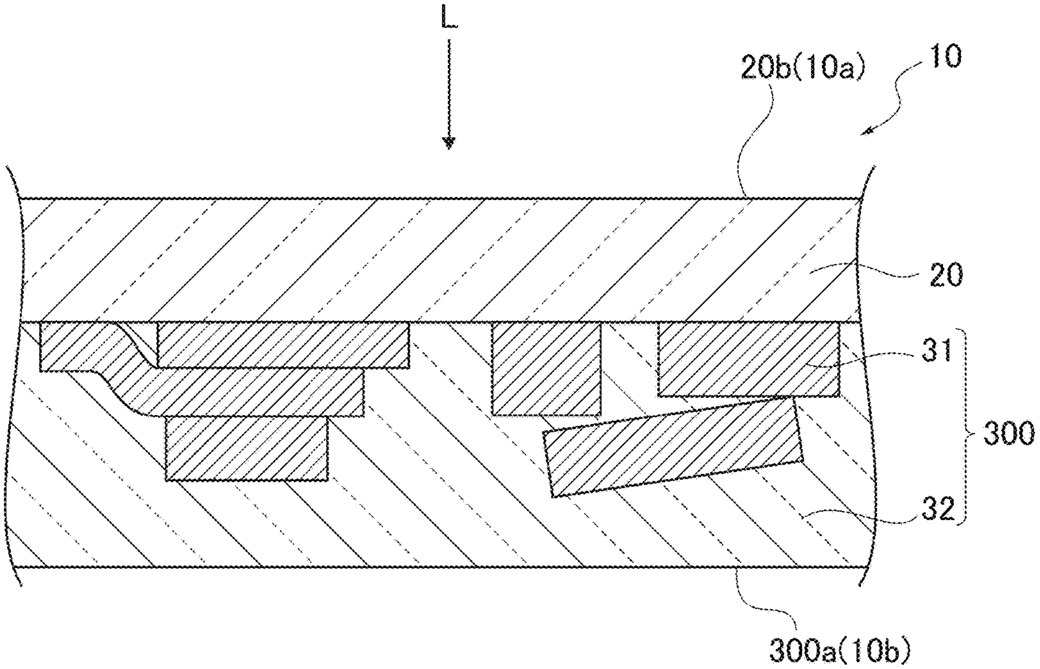
FIG. 16 is a sectional view corresponding to FIG. 11, illustrating a second modified example of the dial of the second embodiment.

When the topcoat 45 has a special function (for example, UV cut function and IR cut function), the dial 10 can be prevented from being burned by the sun or being a high (Second Modified Example) FIG. 16 is a sectional view corresponding to FIG. 11, illustrating the second modified example of the dial 10 of the second embodiment. In the dial 10 of the second embodiment, the dispersion film 300 is provided on the front face 10*a* of the dial 10 and the base 20 is provided on the rear face 10*b* of the dial 10. However, as illustrated in FIG. 16, in the timepiece display plate according to the present disclosure, the base 20 may be provided on the front face 10*a* of the dial 10 and the dispersion film 300 may be provided on the rear face 10*b* of the dial 10.

Namely, the dial 10 illustrated in FIG. 16 includes the front face and the rear face opposite to the front face and the rear face of the dial 10 illustrated in FIG. 11 such that the rear face 20*b* of the base 20 in FIG. 11 is the front face 10*a* of the dial 10, and the front face 300*a* of the dispersion film 300 in FIG. 11 is the rear face 10*b* of the dial 10.

Even when the lamination order of the base 20 and the protection layer 40 in the dial 10 is changed as described above, the effects similar to those of the dial 10 and the timepiece 100 of the second embodiment can be obtained.

In this case, the base 20 may be used as the topcoat 45 illustrated in FIG. 15, so that the base 20 may be colored.

Figure 17:
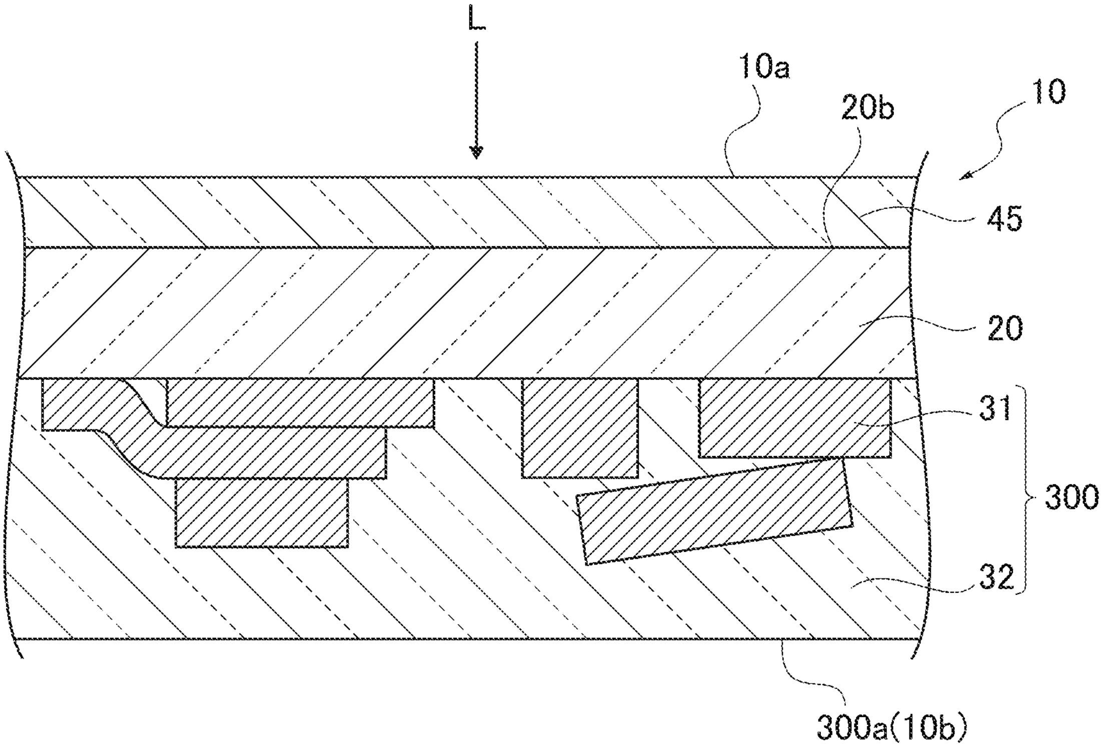
FIG. 17 is a sectional view corresponding to FIG. 11, illustrating a third modified example of the dial of the second embodiment in which the first modified example of the second embodiment is incorporated into the second modified example of the second embodiment.

(Third Modified Example) FIG. 17 is a sectional view corresponding to FIG. 11, illustrating a dial 10 of the third modified example in which the second modified example is combined with the first modified example. In the dial 10 of the third modified example, the topcoat 45 is provided on the rear face 20*b* of the base 20.

As described above, with the configuration in which the topcoat 45 is laminated on the base 20, the effects similar to those of the dial 10 and the timepiece 100 of the second embodiment can be obtained, and the color of the dial 10 can be changed by changing only the color of the topcoat 45 while standardizing the basic structural portions of the dial 10 such as the base 20 and the dispersion film 300.

When the topcoat 45 has a special function (for example, UV cut function and IR cut function), the dial 10 can be prevented from being burned by the sun and being a high temperature.

In the dial 10 of the above described second embodiment and the modified examples, the aluminum flakes 31 are used as the metal foil flakes dispersed in the dispersion film 300. However, in the timepiece display plate of the present disclosure, another metal foil piece different from aluminum or aluminum alloy can be used instead of the aluminum flake 31.

In the dial 10, a metal thin piece colored by a painting process, a vapor deposition process, or another surface process can be used.

Although the present disclosure has been described in terms of exemplary embodiments, it should not be limited thereto. It should be appreciated that variations or modifications may be made in the embodiments described by persons skilled in the art without departing from the scope of the present invention as defined by the following claims.

What is claimed is:

1. A timepiece display plate comprising:

a flat plate base that transmits light;

a plurality of metallic foil pieces consisting of one or more pure metals that are disposed directly upon one face of the base, each of the plurality of metallic foil pieces having a thickness that transmits the light; and a protection layer that is laminated on the one face to cover the metallic foil pieces and transmits the light, wherein the plurality of metallic foil pieces are stacked upon no more than one face of the flat plate base and directly touching each other.

2. The timepiece display plate according to claim 1, wherein each of the plurality of metallic foil pieces has the thickness of 10 to 30 nm.

3. The timepiece display plate according to claim 1, comprising a front face and a rear face, wherein a transmittance of the light from the front face to the rear face is set to 10 to 50%.

4. The timepiece display plate according to claim 1, wherein an opening ratio percent, which is a percentage of an opening portion without the plurality of metallic foil pieces on the one face relative to an entire surface area of the one face, is 3 to 45%.

5. The timepiece display plate according to claim 1, wherein the protection layer has a thickness of 1 to 5 μm.

6. A timepiece comprising the timepiece display plate according to claim 1 as a dial.

7. A timepiece display plate comprising:

a flat plate base that transmits light;

a dispersion film in which a plurality of metallic foil pieces are dispersed, with a first subset of the metallic foil pieces disposed directly upon the flat plate base, and a second subset of the metallic foil pieces being stacked and directly touching the first subset of metallic foil pieces, the metallic foil pieces reflecting the light to a resin that transmits the light, wherein the flat plate base and the dispersion film are laminated; and the dispersion film includes an opening portion without the plurality of metallic foil pieces, the opening portion having a predetermined opening ratio percent relative to an entire surface area of the dispersion film in a planar view of the flat base plate, and the plurality of metallic foil pieces are stacked upon no more than one face of the flat plate base and directly touching each other.

8. The timepiece display plate according to claim 7, wherein the predetermined opening ratio percent is 10 to 50%.

9. The timepiece display plate according to claim 7, wherein the dispersion film has a thickness that is 1.6 to 62.5 times a thickness of at least one metallic foil piece of the plurality of metallic foil pieces.

10. The timepiece display plate according to claim 7, wherein at least one metallic foil piece of the plurality of metallic foil pieces has a thickness that is 1 μm or less.

11. The timepiece display plate according to claim 7, wherein the dispersion film has a thickness of 1 to 5 μm.

12. The timepiece display plate according to claim 7, wherein a blending amount percentage of the plurality of metallic foil pieces relative to a total of the resin in the dispersion film is 1.5 to 2.0%.

13. The timepiece display plate according to claim 7, wherein the plurality of metallic foil pieces are laminated in a thickness direction of the dispersion film perpendicular to a front face of the flat plate base by stacking one of the plurality of metallic foil pieces directly on top of another one of the plurality of metallic foil pieces in at least a part of the dispersion film.

14. The timepiece display plate according to claim 7, wherein a colorless topcoat or a colored topcoat that transmits the light is laminated on the dispersion film or the base.

15. The timepiece display plate according to claim 7, comprising a front face and a rear face, wherein a transmittance of the light from the front face to the rear face is set to 10 to 50%.

16. A timepiece comprising the timepiece display plate according to claim 7 as a dial.

17. The timepiece display plate according to claim 7, wherein the plurality of metallic foil pieces consist of one or more pure metals.

18. The timepiece display plate according to claim 7, wherein one of the second subset of the metallic foil pieces is bent along a corner formed between one of the first subset of the metallic foil pieces and the flat plate base.

19. The timepiece display plate according to claim 7, wherein the first subset of the metallic foil pieces lie directly on the flat plate base such that a plurality of flat faces of the metallic foil pieces are substantially parallel a front face of the flat plate base.

* * * * *